US009285072B1

(12) United States Patent
Banty

(10) Patent No.: US 9,285,072 B1
(45) Date of Patent: Mar. 15, 2016

(54) UNIVERSAL JACKSHAFT MOUNTING PLATE AND KIT

(71) Applicant: Jon C. Banty, Oak Creek, WI (US)

(72) Inventor: Jon C. Banty, Oak Creek, WI (US)

(*) Notice: Subject to any disclaimer, the term of this patent is extended or adjusted under 35 U.S.C. 154(b) by 60 days.

(21) Appl. No.: 13/891,932

(22) Filed: May 10, 2013

Related U.S. Application Data

(60) Provisional application No. 61/646,673, filed on May 14, 2012.

(51) Int. Cl.
| F16M 13/00 | (2006.01) |
| F16M 13/02 | (2006.01) |
| B23P 19/00 | (2006.01) |

(52) U.S. Cl.
CPC ................ *F16M 13/02* (2013.01); *B23P 19/00* (2013.01)

(58) Field of Classification Search
USPC .................................. 248/640, 646, 500, 503
See application file for complete search history.

(56) References Cited

U.S. PATENT DOCUMENTS

| 1,410,725 | A | | 3/1922 | Schank |
| 1,570,591 | A | | 1/1926 | Mercer |
| 2,220,705 | A | | 11/1940 | Burckes |
| 2,756,953 | A | | 7/1956 | Button et al. |
| 2,958,489 | A | | 11/1960 | Remke et al. |
| 4,624,438 | A | * | 11/1986 | Goodman, Jr. ................ 248/642 |
| 4,779,844 | A | | 10/1988 | Mitchell |
| D330,671 | S | | 11/1992 | Greene et al. |
| 7,066,341 | B1 | * | 6/2006 | Hartford ..................... 211/85.13 |
| RE39,414 | E | * | 11/2006 | Poll ................................. 440/55 |
| 7,137,474 | B2 | * | 11/2006 | Yokote .......................... 180/314 |
| 7,896,592 | B1 | * | 3/2011 | Winchel et al. .................... 410/3 |
| 2004/0097312 | A1 | | 5/2004 | Martinson et al. |
| 2005/0028795 | A1 | | 2/2005 | Benson |

* cited by examiner

*Primary Examiner* — Steven Marsh
(74) *Attorney, Agent, or Firm* — Boyle Fredrickson, S.C.

(57) ABSTRACT

This invention relates to a jackshaft mounting plate for connection to a motor that forms part of a jackshaft plate mounting kit. The mounting plate includes a flat base plate operably securable to a bottom surface of the motor and a pair of supports connected to the base plate to rotatably support a jackshaft therebetween. The jackshaft is operably connected to the output shaft of the motor such that the output of the motor can be translated by the jackshaft to operate an attachment operably connected to the jackshaft opposite the motor.

9 Claims, 5 Drawing Sheets

UNIVERSAL JACKSHAFT MOUNTING PLATE AND KIT

CROSS-REFERENCE TO RELATED APPLICATIONS

This application claims priority from U.S. Provisional Application Ser. No. 61/646,673, filed May 14, 2012, the entirety of which is hereby expressly incorporated by reference herein.

FIELD OF THE INVENTION

This invention relates to a device for use in mounting and engaging a jackshaft with a motor, such as on a motorized device, and for connecting the jackshaft to the device.

BACKGROUND OF THE INVENTION

A variety of different motorized devices, such as all-terrain vehicles or motor bikes, employ a jackshaft in order to enable the rotational output of a motor to be transferred to a driven member of the device, such as the wheels or other moving implement. The jackshaft often comes in a kit that includes each of the components necessary to mount the jackshaft to the motorized device.

The general structure of the jackshaft utilizes a mounting plate connected to the motor adjacent an output shaft of the motor. As shown in FIG. 1, the prior art jackshaft mounting plate 1000 is mounted flush to the side of the motor 16 and includes an aperture 1002 through which the output shaft 1004 extends. A drive pulley 1006 is mounted to the end of the output shaft 1004 extending through the aperture 1002. The drive pulley 1006 is connected opposite the output shaft 1004 to a driven pulley or sprocket 1008 spaced from drive pulley 1006, such as by a belt of chain. The driven pulley 1008 is mounted to one end of a jackshaft 1010 that extends through an opening in the mounting plate 1000 and is rotatably secured therein by a suitable member, such as a bearing member, and can also be secured directly to the mounting plate 1000 in a suitable manner. The opposite end of the jackshaft 1010 can be directly connected to the motive member of the device, or can be rotatably supported by a separate bearing member, with the opposite end of the jackshaft 1010 including another driven sprocket (not shown) that is operably connected to the connected to the driven member of the device.

With this structure, when the motor 16 is operated, the rotation of the output shaft 1004 of the motor 1006 transfers the rotation of the output shaft 1004 from the output shaft 1004 to the drive pulley 1006, from the drive pulley 1006 to the first driven pulley or sprocket 1008, from the first driven pulley 1008 to the jackshaft 1010, from the jackshaft 1010 to the second driven pullet, and from the second driven pulley to the driven member, e.g, the wheels of the device.

However, when using kits and particularly the mounting plates included in the kits, the plates are configured for use with a limited number of motor designs. Thus, when it is desired to use a particular mounting plate with a motor that is not tailored for the mounting plate, it is necessary to make alterations to the motor to enable the mounting of the plate thereon. These alterations often require the grinding of the engine block cooling fins of the motor to accommodate the mounting plate configuration, which can be time consuming, can negatively affect the operation of the motor, and can void any warranties with regard to the motor.

Accordingly, the prior art does not satisfy the needs and solutions required for a mounting plate for use in securing a jackshaft to motors with different configurations, such that it is desirable to develop a jackshaft mounting plate and kit including the mounting plate that can be universally mounted for use with multiple motor designs and configurations.

SUMMARY OF THE INVENTION

According to one object of the present disclosure, a mounting plate is provided that is capable of being mounted to motors having a number of different configurations. The mounting plate includes a base plate, and a number of supports extending upwardly from the base plate. The supports include a pair of aligned apertures therein through which a jackshaft can be rotatably mounted. The supports are located at one end of the base plate, such that the motor can be mounted to the base plate at a position spaced from the supports. The base plate is mounted to the motor at a position spaced from the supports such that the motor rests on top of the base plate when secured thereto. In this position, the base plate does not interfere with any components of the motor, such that the base plate can easily be mounted to the bottom of a motor of any configuration, and to motors already secured to the frame of a device.

According to another object of the present disclosure, the supports are formed with a support tube extending therebetween that encloses the jackshaft between the driven members on each side of the jackshaft.

According to still another object of the present disclosure, the base plate can include an extension disposed adjacent the supports that extends outwardly from one or both sides of the base plate. The extension can include a further support thereon which can function to partially enclose the driven member on the jackshaft that is connected to the drive pulley, thereby providing an additional measure of protection and support to the connection between the motor and the jackshaft.

According to still a further aspect of the present invention, the mounting plate is configured to be usable in conjunction with a motor having an output shaft on either side of the motor without having to change the orientation of the mounting plate.

According to still another aspect of the present invention, the mounting plate can be provided without mounting apertures to enable the mounting plate to form part of a jackshaft kit in which the base plate and supports of the mounting plate can be drilled as desired to enable attachment of the mounting plate to a motor having a particular configuration.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present invention.

In the drawings.

DETAILED DESCRIPTION OF THE INVENTION

Figure 1:
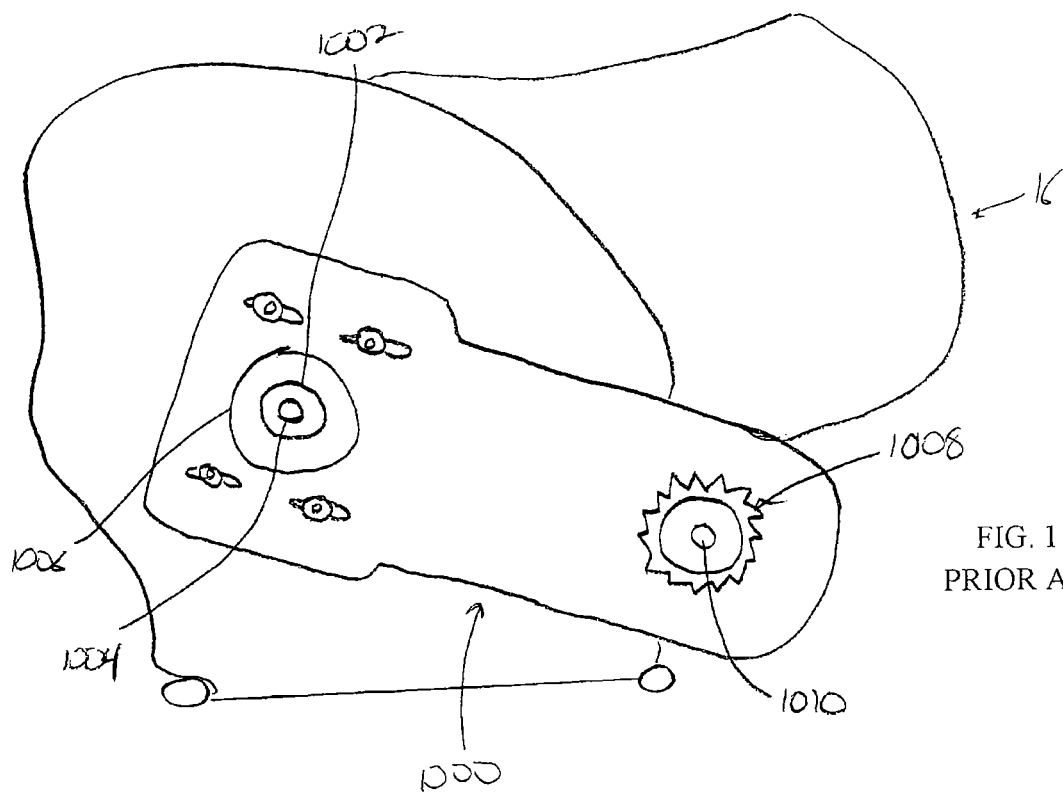
FIG. 1 is a side pan view of a prior art jackshaft mounting plate secured to a motor.
Figure 2:
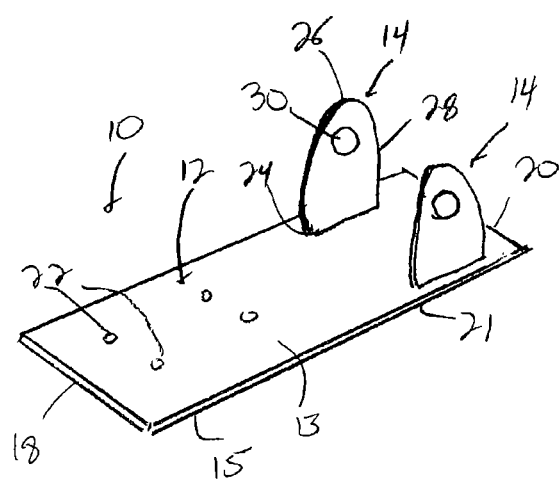
FIG. 2 is a perspective view of a jackshaft mounting plate constructed according to the present invention.

With reference now to the drawing figures in which like reference numbers represent like features throughout the application, a mounting plate constructed according to the present invention is indicated at 10 in FIG. 2. The mounting plate 10 includes a base plate 12 and a pair of supports 14, though other numbers of supports 14 are also contemplated. The base plate 12 and the supports 14 can be formed of any suitable material, such as a metal, including steel, among others, and can be shaped to fit the desired motorized device 100 including the motor 16 to which the mounting plate 10 is secured.

Figure 3:
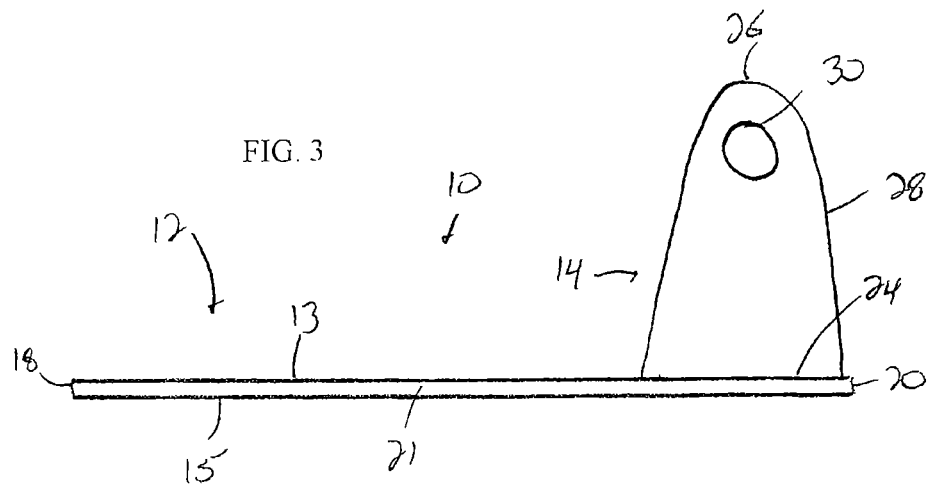
FIG. 3 is a side elevation view of the mounting plate of FIG. 1.
Figure 4:
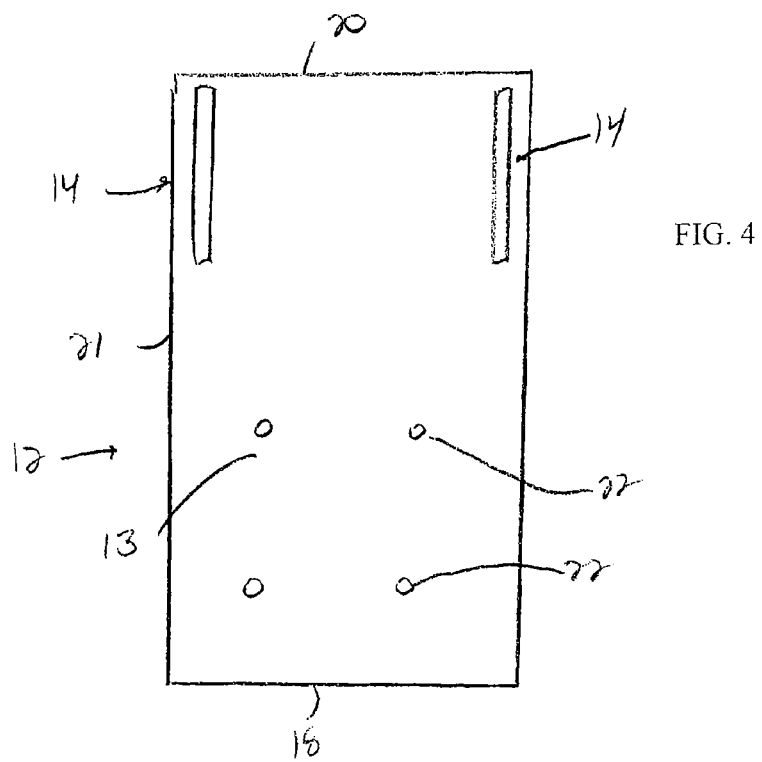
FIG. 4 is a top plan view of the mounting plate of FIG. 1.

In the embodiment illustrated in FIGS. 2-4, the base plate 12 is rectangular in shape with a completely flat upper surface 13 and a completely flat lower surface 15, and is formed from steel. The base plate 12 has a front end 18 and a rear end 20 joined by sides 21, and is formed with a thickness sufficient to withstand the use to which the mounting plate 10 is to be put. In the illustrated embodiment, the thickness of the plate 12 is between about 0.125 inches and about 1.0 inch, and more preferably is between about 0.125 inches and about 0.50 inches in thickness. The base plate 12 can have a number of apertures 22 formed therein that correspond to a particular mounting configuration for the motor 16 in order to receive bolts, screws or any other suitable mechanical fasteners (not shown) therethrough to secure the motor 16 to the base plate 12, or can be formed without the apertures 22 such that the apertures 22 can be formed as desired when compared to the actual aperture configuration necessary for the attachment of the base plate 12 to a particular motor 16.

The supports 14 are secured to the upper surface 13 of the base plate 12 at or adjacent the second end 20 of the base plate 12 in a suitable manner, such as by welding the supports 14 to the base plate 12. While the supports 14 can have any desired configuration, in the illustrated embodiment each support 14 is formed with a flat, wide end 24, that is secured to the base plate 12, and a narrow, curved end 26, with tapering side edges 28 extending therebetween. The material forming the supports 14 is similar to that used for the base plate 12. The supports 14 each include an opening 30 formed in the support 14 adjacent the upper end 28, that, as shown in the illustrated embodiment, is optionally disposed at a location equally spaced in a radial direction from the curved, upper end 28 along the upper circumference of the opening 30 to provide increased strength to the support 14. Similarly to the base plate 12, the openings 30 in the supports 14 can be formed with the openings 30 therein that correspond to a particular mounting configuration, or can be formed without the openings 30 such that they can be formed as desired when compared to the actual configuration necessary for a particular motor 16. When the openings 30 are formed in the supports 14, the mounting plate 10 can also include tubing 32 secured between the supports 14 in alignment with the openings 30, as shown in FIG. 2. The tubing 32 can be shaped to terminate at each of the supports 14 or can be formed to extend outwardly past one or both of the supports 14 to provide additional support and protection to the jackshaft 34 extending through the tubing 32. The length of the tubing 32 can also be utilized to enable a longer jackshaft 34 to be utilized with a mounting plate 10.

When the mounting plate 10 is included as part of a kit 200, in addition to the mounting plate 10, in the illustrated embodiment the kit 200 includes a jackshaft 34, the tubing 32 (separate from the supports 14 on the mounting plate 10 when the openings 30 are not pre-formed), a drive member 36 (e.g., pulley or sprocket), a first driven member 38 (e.g., pulley or sprocket), a second driven member 40 (e.g., pulley or sprocket), a drive belt or chain 42, a driven belt or chain 44, a number of shaft bearings 46 and a number of locking collars 48. To assemble the kit 200, after the base plate 12 and supports 14 are formed with the necessary apertures 22 and openings 30, as desired, the bearings 46 are secured to the supports 14 in or around the openings 30 in a known manner, and the jackshaft 34 is inserted therethrough. After the jackshaft 34 is positioned within the openings 30 in a desired location, the first driven member 38 is secured to one end of the jackshaft 34, while the second driven member 40 is secured to the opposite end. This assembly of the jackshaft 34 and driven members 38, 40 is retained on the supports 14 using the locking collars 48 positioned on the jackshaft 34 immediately adjacent the driven members 38 and 40. The base plate 12 is then secured to the bottom of the motor 16 in order to position the first driven member 38 in alignment with the drive member 36, such that the drive belt 42 can be secured therebetween. The driven belt 44 is then secured between the second driven member 40 and the motive member (not shown) that is to be operated by the motor 16 via the jackshaft kit 200.

Subsequent operation of the motor 16 rotates the drive member 36 operably connected to the motor 16, which in turn rotates the first driven member 38 and the jackshaft 34 via the drive belt 42, which turns the second driven member 40 and consequently the driven belt 44.

Figure 5:
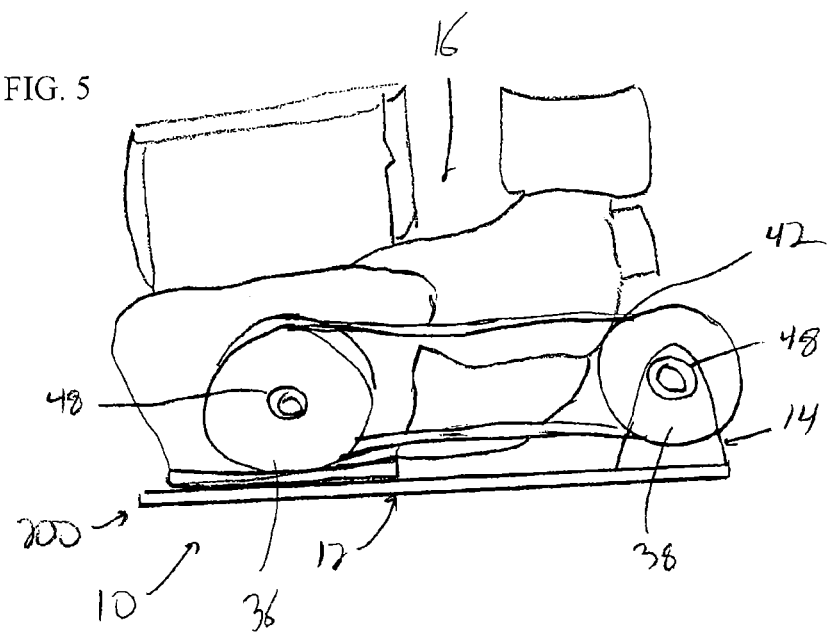
FIG. 5 is a perspective view of the mounting plate of FIG. 1 secured to a motor.
Figure 6:
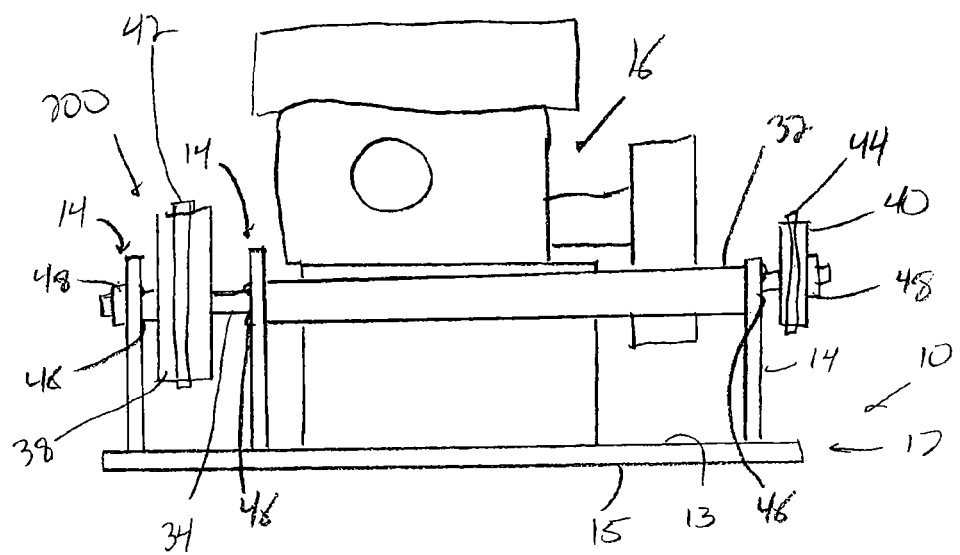
FIG. 6 is a rear elevation view of the mounting plate of FIG. 5.
Figure 7:
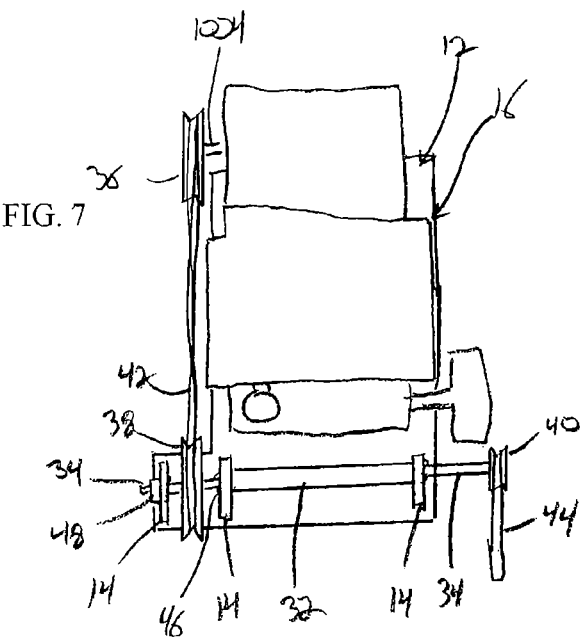
FIG. 7 is a top plan view of the mounting plate of FIG. 5.

Looking now at FIGS. 5-7, when attached to the motor 16, the base plate 12 is positioned directly beneath the motor 16. In this position, the mounting plate 10 does not require any modification to the structure of the motor 16, as the already flat bottom of the motor 16 is the portion of the motor 16 secured to the base plate 12. Further, the configuration of the mounting plate 10 with the flat base plate 12 also does not extend the profile of the motor 16 below that of the motor 16 itself, such that the space required to mount the mounting plate 10 on existing device 100 is virtually negligible. Also, the configuration of the mounting plate 10 enable the plate 10 to be used with freestanding motors 16, i.e., motors 16 not connected to any device 100, in order to use the motor 16 and kit 200 to power any suitable item (not shown), such as a generator. The flat base plate 12 enables the mounting plate 10 and motor 16 to be stably positioned on any relatively flat surface for operation of the motor 16. Additionally, in this configuration, the kit 200 when assembled to the motor 16 using the mounting plate 10, can be affixed to the frame of a vehicle for use in operably connecting the motor 16 to the motive components of the vehicle to operate the vehicle.

Further, in the embodiment where the motor 16 is not formed as part of a vehicle or other device, the motor 16 can simply rest on the upper surface 13 of the base plate 12, relying on the weight of the motor 16 and the connection to the jackshaft 34 to maintain the position of the motor 16 on the mounting plate 10.

Figure 8:
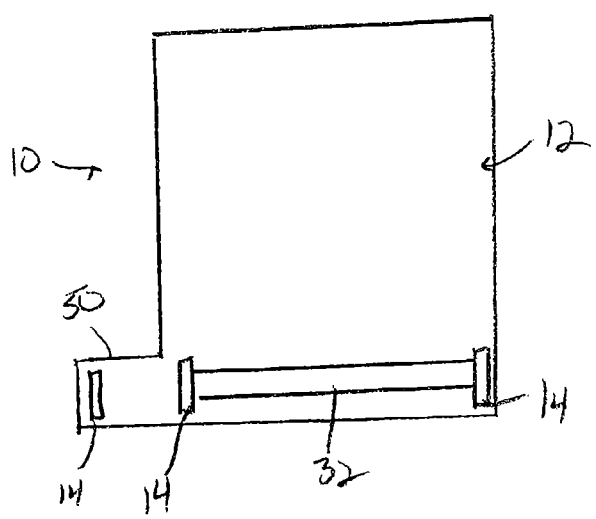
FIG. 8 is a top plan view of a second embodiment of the mounting plate constructed according to the present invention.
Figure 9:
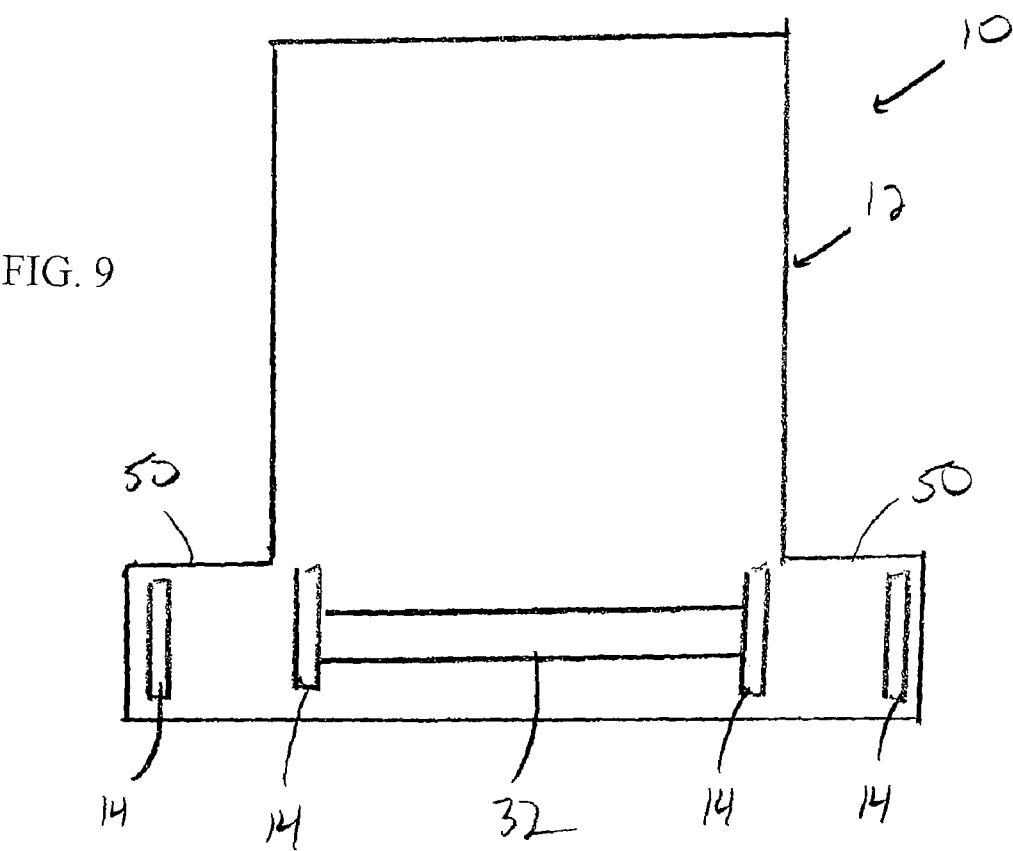
FIG. 9 is a top plan view of a third embodiment of the mounting plate constructed according to the present invention.

In alternative embodiments shown in FIGS. 8 and 9, the base plate 12 can include extensions 50 extending from one or both sides of the base plate 12 adjacent the supports 14. Each extension 50 provides a location for the attachment of an additional support 14 to the mounting plate 10 to provide additional support to the jackshaft 34. In addition, the orientation of the mounting plate 10 can be reversed, if desired, to position the supports 14 in front of the engine or motor 16, with motor 16 mounted near at the rear of the base plate 12, in order to locate the output from the motor 16 on the desired side 21 of the base plate 12 of the mounting plate 10.

Various other alternatives are contemplated is being within the scope of the following claims particularly pointing out and distinctly claiming the subject matter regarded as the invention.

I claim:

1. A jackshaft mounting plate for connection to a motor, the mounting plate comprising:
   a) a base plate operably securable directly to a bottom surface of the motor; and
   b) a pair of supports secured to the base plate to rotatably support a jackshaft therebetween; and
   c) tubing fixed to and extending between the supports and adapted to receive the jackshaft therethrough.

2. The mounting plate of claim 1 wherein the tubing extends completely through at least one of the supports.

3. The mounting plate of claim 1 further comprising at least one extension on the base plate.

4. The mounting plate of claim 3 wherein the at least one extension is coplanar with the base plate and disposed on the base plate adjacent one of the pair of supports.

5. The mounting plate of claim 1 wherein the base plate is completely flat.

6. The mounting plate of claim 1 further comprising a number of mounting apertures formed in the base plate.

7. A jackshaft mounting kit comprising the mounting plate of claim 1.

8. A method for attaching a jackshaft mounting plate to a motor, the method comprising the steps of:
   a) providing the mounting plate of claim 1;
   b) securing an upper surface of the base plate of the mounting plate to a bottom surface of the motor.

9. The method of claim 8 further comprising the step of forming mounting aperture in the base plate to accommodate the motor structure prior to securing the base plate to the motor.

* * * * *